Sept. 28, 1937.   W. T. M. BRUNNEMER   2,094,142
INDEPENDENT WHEEL SUSPENSION
Filed Jan. 28, 1935   3 Sheets-Sheet 3

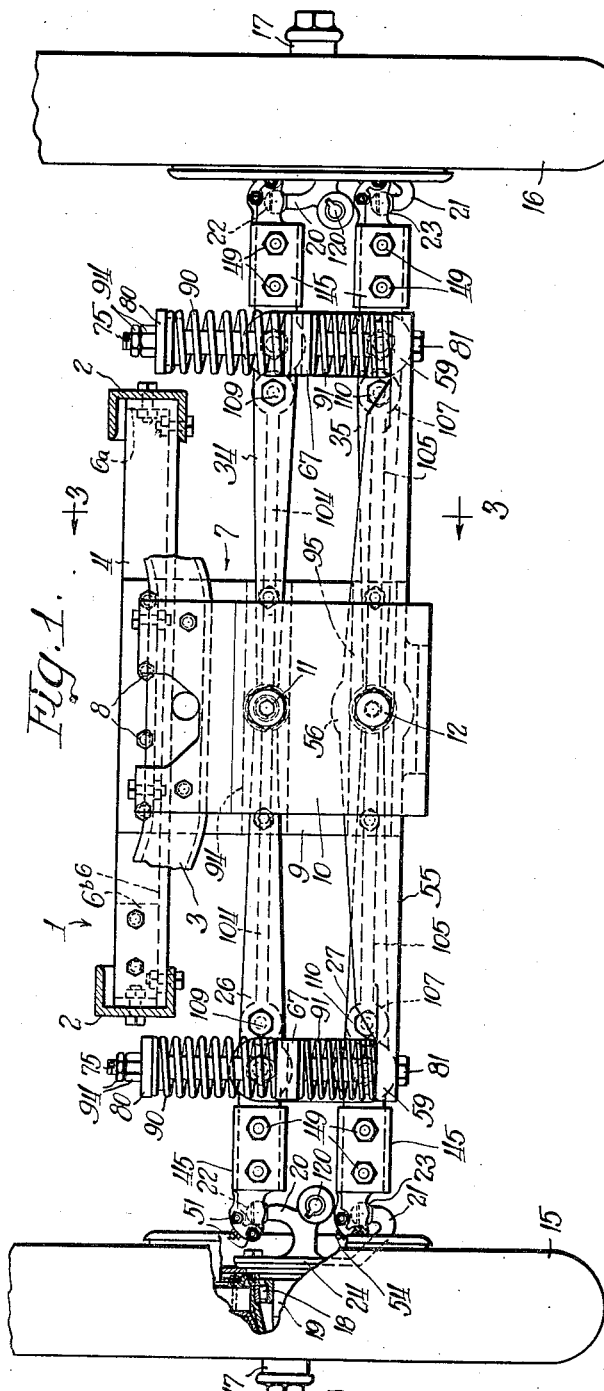

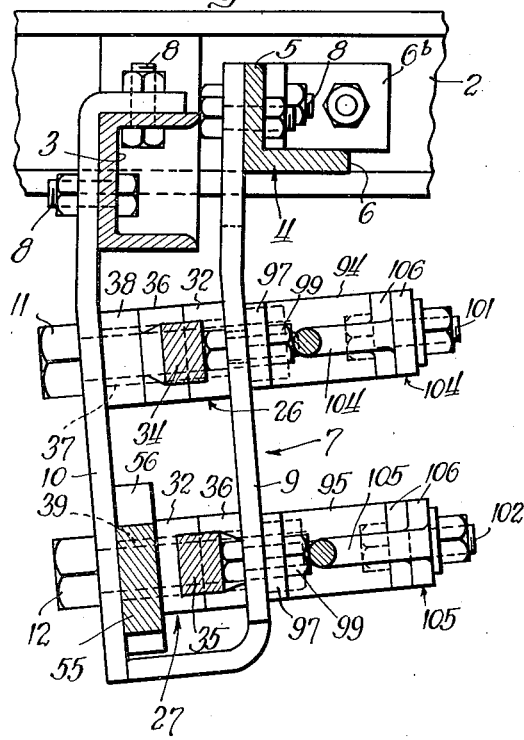
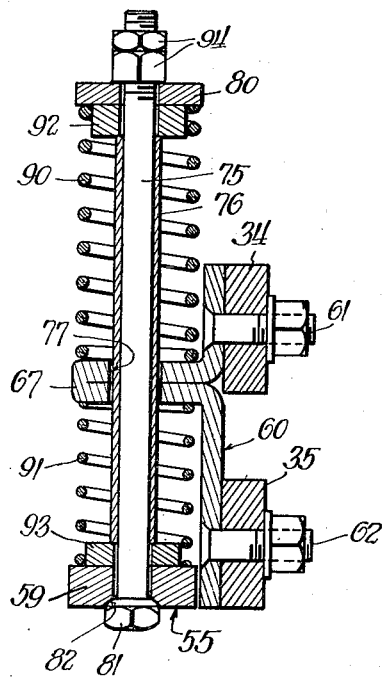
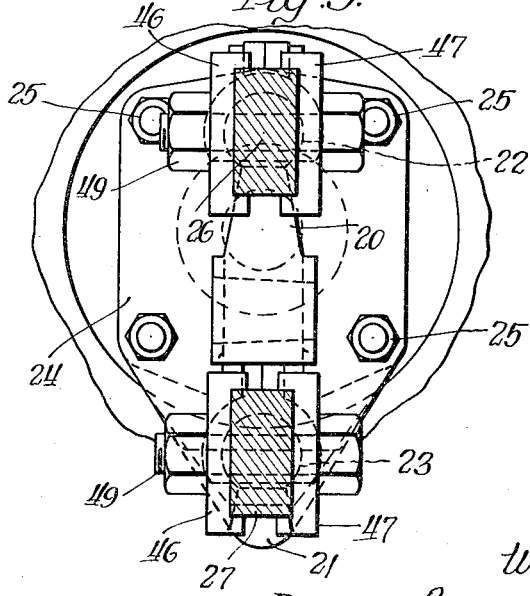
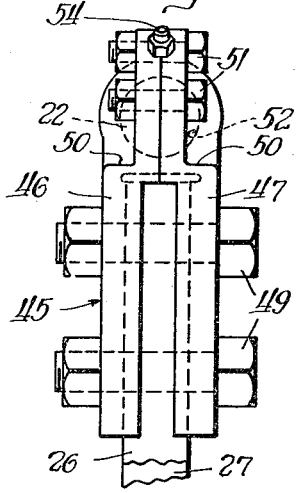

Inventor:
William T. M. Brunnemer

Patented Sept. 28, 1937

2,094,142

UNITED STATES PATENT OFFICE 2,094,142

INDEPENDENT WHEEL SUSPENSION

William T. M. Brunnemer, Monte Vista, Colo.

Application January 28, 1935, Serial No. 3,718

19 Claims. (Cl. 267—20)

The present invention relates to spring suspension means for motor vehicles and the like and has for its principal purpose the provision of an independent wheel suspension arrangement in which the main frame of the vehicle will not be subjected to any twisting or distorting by providing a spring movement that will exert the same pressure on each wheel in all positions thereof, both with respect to each other and with respect to the vehicle frame.

Another object of the present invention is to provide an axle unit embodying connecting links and spring supporting means so constructed and arranged that the wheels are caused to retain at all times a perpendicular or vertical position with each of the wheels being subjected to the same pressure or weight, irrespective of their relative positions.

A further object of the present invention is the provision of suspension means which embodies a low underslung third point of suspension for the front axle unit by which the weight of the front end of the vehicle is supported on a carrying arm pivoted at its center and connected near its ends through suitable spring means with both wheels which are mounted for independent movement. By virtue of this construction each wheel bears the same load irrespective of the vertical position of either of them with respect to the other.

Another object of the present invention in this connection is a provision of improved spring means arranged not only to support the weight of the vehicle but also to act as a shock absorber and to cushion rebounds.

These and other objects of the present invention will be apparent to those skilled in the art after a consideration of the following detailed description of the preferred structural embodiment, taken in conjunction with the accompanying drawings illustrating such embodiment.

In the drawings:

Figure 1 is a rear view looking forwardly of a front axle assembly embodying the principles of the present invention;

Figure 2 is a worm's eye view of the major portion of the construction shown in Figure 1;

Figure 3 is a section taken on an enlarged scale along the line 3—3 of Figure 1;

Figure 4 is an enlarged section taken along the line 4—4 of Figure 2;

Figure 5 is a section taken along the line 5—5 of Figure 2;

Figure 6 is a fragmentary plan view of one of the brackets connecting one of the upper links with the associated steering yoke;

Figure 7:
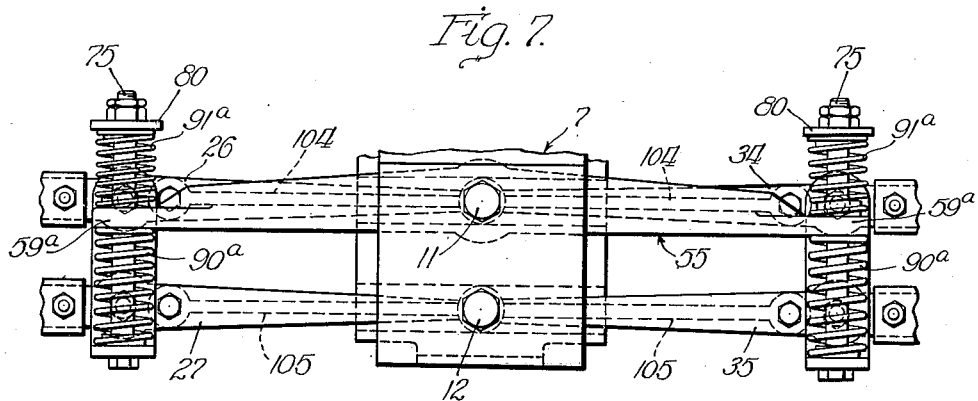
Figure 7 is a modified form of the present invention illustrating the manner in which the load carrying arm may be mounted on the upper pivot.

Referring now to the drawings, particularly to Figures 1, 2 and 3, the reference numeral 1 indicates a vehicle frame of more or less conventional construction embodying side frame members or channels 2. The channels 2 are usually connected together by suitable diagonal and transverse members, one of which is shown at 3 in Figure 3. According to the principles of my invention, I provide or make use of a transverse angle member indicated in its entirety by the reference numeral 4 which, as best shown in Figure 3, has a vertical flange 5 and a forwardly extending horizontal flange 6. The member 6 can be secured to the vehicle frame in any desired manner, as by angle brackets 6a and 6b, or by any other means. A main supporting body bracket 7 is rigidly secured to the transverse members 3 and 4 by any suitable means, such as welding, riveting or the like, but in one form of my invention I prefer to use a plurality of bolts 8. Preferably the bracket 7 comprises two downwardly depending bracket sections 9 and 10 provided with pairs of apertures suitably spaced in a generally vertical direction for the reception of pivot pins or bolts 11 and 12 for a purpose which will appear later. Also, the body bracket 7 is bent forwardly at a slight angle, as best shown in Figure 3, to secure the proper cant for the front wheels.

In order to best illustrate the principles of the present invention, the vehicle suspension means illustrated in Figure 1 takes the form of a front axle unit or assembly. Front wheels 15 and 16, each having a hub 17, are journaled by suitable bearing means 18 on a wheel spindle 19, the latter having upper and lower yoke sections 20 and 21 terminating in upwardly extending ball ends 22 and 23. The yoke sections 20 and 21 are both directed upwardly so that each takes its share of the load. If desired, the yoke sections 20 and 21 may be formed integral with the spindle 19, but I prefer to form the yoke with a supporting plate section 24 (Figures 1 and 5) to which the spindle is secured, as by bolts 25.

The spindles 19 and steering yokes are connected with the main supporting bracket 7 by a system of parallel links. The links connecting the left hand wheel 15 with the frame are indicated by the reference numerals 26 and 27, and each are provided with an enlarged apertured end 32, offset as best shown in Figure 2. The right hand upper and lower links 34 and 35 extend in the opposite direction from the links 26 and 27, and the inner end of each of the links 34 and 35 is likewise provided with an enlarged apertured end 36 similarly offset. The inner apertured ends 32 and 36 of the upper links 26 and 34 are mounted on a bushing 37 or the like carried on the upper pivot bolt 11, which may also carry a spacing collar 38, and the lower links are pivotally mounted on a similar bushing 39 supported on the lower bolt 12, as shown in Figure 2.

The outer ends of the links 26, 27, 34 and 35 carry suitable brackets receiving the ball ends 22 and 23. Each bracket is indicated by the numeral 45, and, as best shown in Figure 6, consists of a pair of separable mating sections 46 and 47 having channel ends to receive the associated parallel link. Bolts 49 or the equivalent are used to secure the bracket sections to the link. The other ends of the mating bracket sections are offset, as at 50 (Figure 6), and secured together, as by bolts 51, so as to form sockets 52 for the reception of the ball ends 22 and 23. A lubrication fitting 54 is provided on each bracket and communicates with the socket 52. The vertical distance between the ball ends 22 and 23 is substantially equal to the vertical distance between the upper and lower pivot bolts 11 and 12, and since, as best shown in Figure 1, the upper and lower links 26 and 27 are of substantially the same length, the links 26 and 27 are disposed parallel with each other at all times, irrespective of the vertical position of the wheel 15, whereby the latter is maintained in a perpendicular position in its vertical movements.

The other front wheel 16 is supported in a similar manner. As stated, links 34 and 35 are pivotally connected at their inner ends to the upper and lower pivot bolts 11 and 12, and at their outer ends are connected to the upper and lower ball ends 22 and 23 of the spindle yoke for that wheel. By virtue of this construction both of the front wheels in the embodiment shown are capable of independent vertical movement with respect to each other and with respect to the main supporting bracket 7 and the frame 1, maintaining at all times their perpendicular position with respect to the supporting surface and in parallelism with respect to each other or substantially so, depending upon the camber of the wheels 15 and 16 where these wheels are front wheels.

A load carrying arm 55 is provided with an enlarged intermediate section 56 and has an opening forged or otherwise formed therein whereby the arm 55 is journaled on the lower pivot bolt 12 and extends laterally in opposite directions therefrom, as best shown in Figures 1 and 2. The ends of the load carrying arm 55 are extended laterally, as at 59, to form spring receiving or holding bracket means, and suitable spring means are associated therewith, as will be explained later, and serve to resiliently transmit the weight of the vehicle to the wheels 15 and 16, preferably through certain ones or all of the parallel links 26, 27, 34 and 35. As best shown in Figure 1, the upper and lower links of each pair are connected together by a vertically disposed spring bracket link member 60, best shown in Figure 4, which is pivotally connected by pivots 61 and 62 with the upper and lower links 34 and 35.

The vertical links 60 are provided with laterally directed bracket sections 67 disposed intermediate their pivot connections 61 and 62 with the upper and lower links 26, 34 and 27, 35. It will be remembered that the load carrying arm 55 is disposed directly on the lower pivot 12 and therefore lies in the plane of the lower links 27 and 35. Each of the laterally directed spring receiving bracket sections 59 is apertured to receive a vertical bolt 75 which extends upwardly in a sleeve 76, and both the bolt and sleeve extend through an opening 77 in the associated link bracket 67. The upper end of each of the bolts 75 is provided with a head 80 which serves as a spring receiving member, and a head 81 at the lower end of each bolt seats in a socket 82 provided in the associated spring receiving bracket 59 at the end of the load arm 55. Each of the heads 80 receives the upper end of a load carrying spring 90, the lower end of each of the springs 90 seating against the laterally directed bracket portion 67 of the associated link 60. A cushioning spring 91 is disposed between the lower face of the bracket section 67 and the spring seat section 59 of the load supporting arm 55. Upper and lower collars 92 and 93 are placed at the upper and lower ends of the sleeve 76, being held in place by tightening the nuts 94 on the upper end of each bolt. The collars 92 and 93 serve to retain the upper end of the load spring 90 and the lower end of the cushioning spring 91 in place. The link bracket 67 may also have such retention means if desired.

In order to brace the transverse links against stresses in a fore and aft direction, I provide suitable braces connected with and actually serving as a part of the aforesaid links. Referring now to Figures 2 and 3, the forward section 9 of the main body bracket 7 carries upper and lower front brace brackets 94 and 95 of generally V-formation, each having ends 97 and 98 apertured and rigidly fastened to the body bracket 7 by bolts 99 connecting the ends 97 and 98 to the forward bracket section 9. The upper and lower front brace brackets 94 and 95 respectively support pivot bolts 101 and 102 upon which the laterally inner ends of upper and lower pairs of diagonal braces 104 and 105 are pivoted. The pairs of braces 104 and 105 may take the form of rods or they may be strap members or have any other suitable or desirable section. Especially where they are in the form of rods, as illustrated, they may have flattened inner and outer ends 106 and 107. The outer ends 107 of the upper pair of braces 104 are rigidly secured, as by bolts 109, to the outer ends of the upper links 26 and 34, and the lower pair of braces 105 are similarly connected by bolts 110 to the lower links 27 and 35. The upper and lower pivot bolts 101 and 102 are respectively disposed in axial alignment with the upper and lower pivot bolts 11 and 12, so that the two bolts 11 and 101 define an axis about which the upper links 26 and 34 and their brace members 104 swing, and the lower bolts 12 and 102 define a second axis about which the lower links 27 and 35 and their brace members 105 swing. Also, as described above, the load carrying arm 55 pivots about the lower axis, but it is of course obvious that the arm may be pivoted for movement about a separate and independent axis if desired.

In operation, the springs 90 at each side support the weight of the front end of the vehicle, transmitted thereto through the load carrying arm 55, which is a rigid member pivotally connected at 12 with the main frame supporting bracket 7, as described above. Generically, the arm 55 and associated springs 90 constitute one spring means which, pivotally connected with the bracket 7 at 12, serves to support the weight of the vehicle on the wheels 15 and 16 with equal pressure. This is true since the distance from the center of pressure of each of the load carrying springs 90 for the two wheels 15 and 16 to the center or pivotal axis at 12, is the same for each wheel. In effect, this produces a three point suspension for the vehicle frame in which, even when one wheel is in a raised position while the other wheel is in a lowered position, the links and the carrying arm 55 are all parallel and the compression of the load carrying springs 90 substantially the same. This secures equal pressure on the wheels without introducing any twisting and distortion into the frame while, at the same time, accommodating the independent movement of the supporting wheels.

By virtue of the parallel links the wheels 15 and 16 are maintained at all times in perpendicular relationship with respect to the supporting surface and in parallel relationship with respect to each other. When the vehicle rebounds upwardly with respect to the supporting wheels, such rebound reactions are cushioned by the springs 91. The forward tilt of the body bracket 7 (Figure 3) secures the desired cant or caster effect, and any desired camber of the front wheels can be secured by properly positioning the steering yoke bracket bolts 45.

It will be noticed that the wheels 15 and 16 in the construction shown in Figure 1, by virtue of the ball and socket connection with the outer ends of the parallel links, can be turned, as by a steering arm 120, about their steering axes as defined by the ball and socket connections. This provides a simplified construction.

Figure 8:
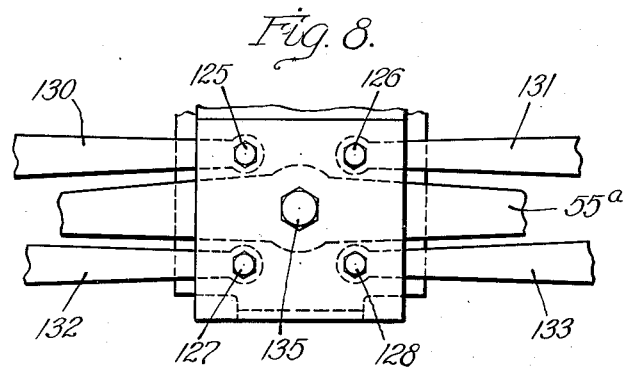
Figure 8 is a further modification, showing the use of separate pivots for the load carrying arm and the several links.

While I have shown and described above the preferred form in which the principles of the present invention have been embodied, it is to be understood that my invention is not to be limited to the particular details shown and described above, but that, in fact, widely different means may be employed in the practice of the broader aspects of my invention. For example, the transverse links at opposite sides of the vehicle need not be connected to the same pivots, but could have separate pivots if desired, as illustrated in Figure 8. In this figure the bracket, indicated by the reference numeral 7a, carries four pivots 125, 126, 127 and 128 to which the inner ends of links 130, 131, 132 and 133 are respectively connected. A fifth pivot 135, separate from the other pivots, is provided in the center of the bracket 7a and receives the load carrying arm 55a. Also, the load carrying arm 55 can be supported on the upper pivot 11, in which case it may be necessary to reverse the springs, so that the load carrying springs are above and the rebound springs below. This construction is illustrated in Figure 7 in which the load carrying springs 90a are carried in spring seats 67a formed at the lower ends of the brackets 60a pivoted to the links 26, 27, 34 and 35 in the manner described above. The load carrying arm 55 in this form, being mounted on the upper pivot 11, has its ends 59a seated on the upper ends of the springs 90a. Cushioning springs 91a are mounted between the upper side of the load carrying arm and the heads 80 at the upper end of the bolts 75.

What I claim, therefore, and desire to secure by Letters Patent is:

1. In a vehicle having a frame, a pair of links pivoted at their inner ends to said frame and extending laterally outwardly, a wheel supporting member pivotally carried at the outer ends of said links, a wheel journaled on said member, a second pair of links pivotally connected with said frame at their inner ends and extending laterally outwardly therefrom in a direction opposite to said first pair of links, a wheel supporting member pivotally carried by said second pair of links at the outer ends thereof, a wheel mounted on said second supporting member, transverse load supporting means pivotally connected with said frame and extending laterally in opposite directions from its point of pivotal connection with said frame to points adjacent said wheels, and load carrying spring means interposed between the ends of said transverse means and at least one link of each pair of links.

2. In a vehicle having a frame, a downwardly disposed bracket secured to one end of the frame, laterally extending vertically spaced link means pivotally connected with said bracket and extending in opposite directions therefrom, a wheel spindle pivotally connected with the outer ends of said laterally extending link means, wheels journaled on said spindles, a load supporting bar pivoted to said bracket substantially in the plane of the lower link means, and coil spring means interposed between the outer ends of said load supporting bar and certain of said link means for imposing the weight of the vehicle thereon, the pivoting of said load supporting bar and said link means providing for equal division of said weight irrespective of the vertical position of the wheels with respect to each other and with respect to said frame.

3. In a vehicle having a frame, a wheel suspension therefor comprising a bracket secured to the central portion of said frame and extending downwardly therefrom, a pair of vertically spaced links extending laterally from each side of said bracket and pivotally connected thereto for independent vertical swinging movement, wheel means carried at the outer ends of each pair of links, bracket means carried by each pair of links adjacent the outer end thereof, coil spring means carried by said bracket means, and a transverse load supporting bar pivotally connected with said frame bracket and extending laterally from its pivot alongside said links and bearing against said coil spring means for imposing the weight of said vehicle and frame on said links through said coil spring means.

4. In a vehicle having a frame, independent wheel suspension means comprising a central downwardly depending bracket secured to said frame, a pair of vertically spaced links extending laterally outwardly from each side of said bracket and pivotally connected thereto at their inner ends so that each pair of links have independent vertical swinging movement relative to the other pair of links, a supporting wheel carried at the outer ends of each pair of links and movable therewith, a load carrying member extending from one side of said frame to the other and pivotally connected at its intermediate portion with said bracket for vertical swinging movement relative to said frame, spring holding means carried at the outer ends of each pair of links, and a pair of coil springs carried by each of said spring holding means, the outer ends of said load carrying member being connected, respectively, with said pairs of coil springs so that certain of said springs serve to support the load and other springs serve to cushion the rebound of said link means and the associated wheel.

5. In a vehicle having a frame, a dependent bracket rigidly secured to said frame, two pairs of parallel links extending laterally in opposite directions from said bracket and pivotally connected at their inner ends thereto for independent swinging movement with respect to each other and to said frame, a wheel carrying member pivoted to the outer ends of each pair of links, a wheel journaled for rotation on each of said wheel carrying members, a spring holding bracket carried by each pair of links adjacent the outer ends thereof and pivotally connected therewith at points disposed in parallelogram relation with respect to the other pivot points of said links, a coil spring carried by each of said spring holding brackets, and a rigid arm pivotally connected at its intermediate portion with said frame bracket and having its laterally extending ends reacting against said coiled springs for the purpose of supporting the weight of the frame on said pair of links.

6. In a vehicle having a frame, a central bracket rigidly secured to the frame at the front end thereof, means providing upper and lower pivots on said bracket, upper and lower links connected at their inner ends, respectively, to said pivots and extending laterally from said bracket, wheel supporting members pivotally connected to the outer ends of said upper and lower links at opposite sides of said frame, supporting wheels journaled on said members, means serving as a third pivot disposed on said bracket, and a member pivoted at its central portion to said third pivot and extending laterally at each side of said frame alongside said links and resiliently connected at its ends so as to support the weight of the frame and said wheels.

7. In a vehicle having a frame, means serving as pairs of upper and lower parallel links pivotally connected to said frame for vertical swinging movement, the upper and lower links constituting a pair at one side of said frame and being movable vertically independently of the upper and lower links constituting the pair at the other side of the frame, wheel supporting means pivotally connected with the outer ends of said pairs of links to move vertically therewith, a load carrying member pivotally connected at its central portion with said frame, bracket means pivotally connected with said pair of links adjacent the supporting wheel means associated therewith, and spring means connecting the laterally outer ends of said load carrying member with said bracket means, respectively, the pivotal connection of said load carrying member with said frame serving to impose equal loads on said bracket means, irrespective of the position of either of said supporting wheel means with respect to the other and to said frame.

8. In a vehicle having a frame, a main bracket connected therewith, means serving as a pair of parallel links pivotally connected with said bracket and extending therefrom at one side of said frame, means serving as a corresponding pair of parallel links pivotally connected with said bracket and extending laterally at the opposite side of said frame, bracket means carried by said links and including laterally directed spring supporting sections, spring means supported thereby and reacting through said bracket means against said links, and a main carrying arm for supporting the weight of the vehicle including a member pivotally connected at its intermediate portion with said bracket and having its ends formed with laterally directed spring receiving portions, whereby said load carrying member reacts against said spring means supported by the laterally directed bracket sections carried by said pairs of parallel links.

9. In a vehicle having a frame, a main bracket connected with said frame, means serving as a pair of parallel links pivotally connected with said bracket and extending toward one side of said frame, means serving as another pair of parallel links pivotally connected at their inner ends to said brackets and extending at the opposite side of said frame, wheel supporting means pivotally connected with the outer ends of said pairs of parallel links, said wheels being thereby connected with said frame for independent vertical movement irrespective of the position of the other wheel, bracket means including laterally directed spring receiving sections pivotally connected with said parallel links for independent movement therewith, a vertical member associated with each of said last named bracket means and slidably connected therewith, a head carried by each vertical member, spring means surrounding each of said vertical members and biased between the head thereof and the associated spring receiving bracket section, and a rigid carrying arm pivotally connected at its intermediate section with said main frame bracket, said carrying member having end portions receiving said vertical members, respectively, and reacting therethrough against said spring means for imposing the weight of the frame through said bracket means and parallel links carrying the same on said supporting wheels.

10. In a vehicle having a frame, a main frame supporting bracket, means serving as two pairs of parallel links extending in opposite directions from said bracket and pivotally connected therewith at vertically spaced points for independent vertical swinging movement with respect thereto and to each other, wheel means pivotally carried at the outer ends of each pair of links for independent vertical movement therewith, means serving as laterally directed spring carrying bracket means pivotally connected with each pair of links, spring means carried by said bracket means, and means pivotally connected with said main frame bracket and reacting against said spring means for imposing the weight of the frame on said links.

11. In a vehicle having a frame, a main supporting bracket, means serving as pairs of oppositely extending parallel links pivotally connected at their inner ends to said bracket, wheel supporting means pivoted to the outer ends of said pairs of links, laterally directed spring receiving bracket means pivotally connected with the upper link of each pair of links, a coil spring means seated on each of said last mentioned bracket means, a main carrying arm pivotally connected at its intermediate portion with said main frame supporting bracket below the pivot means for said upper links, and means on the outer ends of said main carrying arm for receiving and reacting against said spring means.

12. In a vehicle having a frame, a main supporting bracket connected therewith, means serving as oppositely extending pairs of parallel links disposed in vertically spaced relation and pivotally connected at their inner ends with said main frame bracket for independent vertical movement relative to each other and to said frame, a main carrying arm pivotally connected at its intermediate portion with said main frame bracket and extending laterally in opposite directions therefrom, spring holding bracket means carried adjacent the outer ends of certain of the links of each pair of parallel links, a pair of coil springs reacting against each of said spring receiving means, and means at the outer ends of said carrying arm for causing the weight of the vehicle supported thereon to react against one coil spring of each pair of springs for supporting the weight and to react against the other spring of each pair of coil springs to resist the rebound of said vehicle frame.

13. In a vehicle having a frame, a supporting body bracket rigidly connected to said frame and having a pair of downwardly depending portions spaced fore and aft with respect to each other, vertically spaced pivot pins carried in said spaced supporting bracket portions, a pair of laterally extending links connected at their inner ends to the upper pivot pin and extending laterally on opposite sides of said bracket, a pair of lower links connected at their inner ends with said lower pivot pin and extending in opposite directions from said bracket, wheel supporting spindle means pivotally connected with the outer ends of said upper and lower links, the upper and lower links at one side of the bracket serving as a system of parallel links for connecting the wheel on that side with the frame and the upper and lower links on the other side serving as parallel link means for connecting the other wheel to said frame, said wheels being thereby mounted for independent vertical movement, a main supporting arm pivotally connected at its intermediate portion on said supporting body bracket and disposed between said fore and aft bracket sections, said main carrying arm extending laterally alongside said links to points adjacent said wheels, and spring means carried at the outer ends of said main carrying arm and serving to transmit the weight of the vehicle, imposed on said carrying arm, to said wheels with equal pressure at opposite sides of the vehicle, independent of the position of either wheel with respect to the other and to the frame.

14. In a vehicle having a frame, a main supporting bracket connected therewith and including downwardly depending fore and aft spaced bracket portions, a pair of vertically spaced pivot pins carried in said portions, upper and lower links pivotally mounted on said pins and extending in opposite directions from said brackets to form pairs of parallel links extending in opposite directions laterally of said frame, wheel supporting spindle means pivotally connected at points spaced vertically the same distance as the spacing between said pivot pins, supporting wheels journaled on said spindles, a main carrying arm pivotally mounted at its intermediate portion on the lower of said pivot pins and disposed substantially in the plane of the lower links, and coil spring means disposed in a vertical position and serving to transmit the weight of the vehicle, transmitted through said carrying arm, to said links with substantially equal pressure irrespective of the vertical position of either wheel with respect to the other and with respect to said frame.

15. In a vehicle having a frame, a central bracket rigidly secured to the frame at the front end thereof, upper and lower pivot means on said bracket, upper and lower transverse links connected at their inner ends, respectively, to said pivot means and extending laterally from said bracket, brace members connected with said links and mounted on said pivot means, said brace members reinforcing said links against fore and aft stresses, wheel supporting members pivotally connected to the outer ends of said upper and lower links at opposite sides of said frame, supporting wheels journaled on said members, and a member pivoted at its central portion to one of said upper and lower pivot means, said member extending laterally at each side of said frame alongside said links and resiliently connected at its ends so as to support the weight of the frame on said wheels.

16. In a vehicle having a frame, a supporting body bracket rigidly connected to said frame and including downwardly depending portions tilted forwardly and spaced fore and aft with respect to each other, upper and lower auxiliary brackets rigidly secured to the forward body bracket portion, vertically spaced pivot means carried in said spaced supporting bracket portions, aligned companion pivot means carried by said auxiliary brackets, a pair of laterally extending links connected at their inner ends to the upper pivot means and extending laterally on opposite sides of said body bracket, a pair of lower links connected at their inner ends with said lower pivot means and extending in opposite directions from said bracket, wheel supporting spindle means pivotally connected with the outer ends of said upper and lower links, the upper and lower links at one side of the bracket serving as a system of parallel links for connecting the wheel on that side with the frame and the upper and lower links on the other side serving as parallel link means for connecting the other wheel to said frame, said wheels being thereby mounted for independent vertical movement, upper and lower brace members connected at their outer ends to said upper and lower links and at their inner ends to the companion pivot means carried by said auxiliary brackets, a main supporting arm pivotally connected at its intermediate portion on the lower of said first pivot means adjacent the rear section of said body bracket but between said fore and aft body bracket sections, said main carrying arm extending laterally in opposite directions alongside said links to points adjacent said wheels, and spring means carried at the outer ends of said main carrying arm and serving to transmit the weight of the vehicle, imposed on said carrying arm, to said wheels with equal pressure at opposite sides of the vehicle, independent of the position of either wheel with respect to the other and to the frame.

17. In a vehicle having a frame, a supporting body bracket rigidly connected with said frame at the central portion thereof, upper and lower transverse links connected at their inner ends, respectively, to said bracket and extending laterally outwardly from the central portion of said frame, wheel supporting members pivotally connected to the outer ends of said links at opposite sides of said frame, a main supporting member connected at its intermediate portion to said centrally disposed bracket and extending laterally outwardly therefrom, and coil spring means connected between the ends of said main supporting member and said wheel supporting members for supporting the weight of the frame on said wheel supporting members.

18. In a vehicle having a frame, a supporting body bracket rigidly connected with said frame at the central portion thereof, upper and lower transverse links connected at their inner ends, respectively, to said bracket and extending laterally outwardly from the central portion of said frame, upper and lower pivot means carried by said bracket for receiving said links, wheel supporting members pivotally connected to the outer ends of said links at opposite sides of said frame, means serving as a main supporting member pivotally connected at its intermediate portion to said bracket, and spring means connected between the outer ends of said main supporting member and certain of said links for both supporting the weight of the frame and cushioning the rebound thereof for supporting the weight of the frame on said wheel supporting members.

19. In a vehicle having a frame, independent wheel suspension means comprising a central downwardly depending bracket secured to said frame, a pair of vertically spaced links extending laterally outwardly from each side of said bracket and pivotally connected thereto at their inner ends so that each pair of links have independent vertical swinging movement relative to the other pair of links, a supporting wheel carried at the outer ends of each pair of links and movable therewith, a load carrying member pivotally connected at its intermediate portion with said bracket for vertical swinging movement relative to said frame for resiliently opposing the weight of the vehicle on said wheels, and spring means acting between said load carrying member and certain of said links for cushioning the rebound of said link means and the associated wheels.

WILLIAM T. M. BRUNNEMER.